United States Patent [19]
McAndrews et al.

[11] Patent Number: 5,884,733
[45] Date of Patent: Mar. 23, 1999

[54] TEMPERATURE COMPENSATING SYSTEM FOR FLUID-DAMPED SUSPENSION SYSTEMS

[75] Inventors: Michael L. McAndrews, Santa Cruz; Ricardo R. Baldomero, Felton, both of Calif.

[73] Assignee: RockShox, Inc., San Jose, Calif.

[21] Appl. No.: 14,376

[22] Filed: Jan. 27, 1998

Related U.S. Application Data

[60] Provisional application No. 60/051,637 Jul. 3, 1997.
[51] Int. Cl.[6] .................................................. F16F 9/52
[52] U.S. Cl. ............................................ 188/276; 188/277
[58] Field of Search .................................. 188/276, 277, 188/274

[56] References Cited

U.S. PATENT DOCUMENTS

| | | | |
|---|---|---|---|
| 2,357,278 | 8/1944 | O'conner ................................. | 188/276 |
| 2,564,790 | 8/1951 | Orloff et al. . | |
| 2,683,034 | 7/1954 | Seddon . | |
| 2,708,112 | 5/1955 | Seddon et al. . | |
| 2,743,102 | 4/1956 | Seddeon et al. . | |
| 2,769,632 | 11/1956 | Bourcier de Carbon . | |
| 2,856,035 | 10/1958 | Rohcas . | |
| 2,944,639 | 7/1960 | Blake ...................................... | 188/276 |
| 2,950,785 | 8/1960 | Patriquin ................................. | 188/274 |
| 2,992,864 | 7/1961 | Bourcier de Carbon . | |
| 3,338,347 | 8/1967 | Avner . | |
| 3,854,710 | 12/1974 | Nicholls . | |
| 3,865,356 | 2/1975 | Wössner . | |
| 3,891,236 | 6/1975 | Kuwano . | |
| 4,057,264 | 11/1977 | Suzuki et al. . | |
| 4,245,826 | 1/1981 | Wirges . | |
| 4,254,849 | 3/1981 | Pohlenz . | |
| 4,262,779 | 4/1981 | Katsumori et al. . | |
| 4,318,535 | 3/1982 | Imai . | |
| 4,428,567 | 1/1984 | Fournales . | |
| 4,553,769 | 11/1985 | Kawaguchi . | |
| 4,785,921 | 11/1988 | Hosan et al. ........................... | 188/276 |
| 4,805,882 | 2/1989 | Veaux et al. . | |
| 4,807,860 | 2/1989 | Simons . | |
| 4,961,482 | 10/1990 | Pohlenz et al. . | |
| 4,971,344 | 11/1990 | Turner . | |
| 5,042,625 | 8/1991 | Maus . | |
| 5,088,705 | 2/1992 | Tsai . | |
| 5,195,766 | 3/1993 | Dohrmann et al. . | |
| 5,271,485 | 12/1993 | Yowell et al. . | |
| 5,308,099 | 5/1994 | Browning . | |
| 5,449,188 | 9/1995 | Ohma . | |

(List continued on next page.)

FOREIGN PATENT DOCUMENTS

| | | | |
|---|---|---|---|
| 420610 | 4/1991 | European Pat. Off. . | |
| 420610 | 2/1996 | European Pat. Off. . | |
| 55-72934 | 11/1978 | Japan ..................................... | 188/277 |
| 94766 | 7/1960 | Netherlands ........................... | 188/277 |
| 2096732 | 10/1982 | United Kingdom ................... | 188/277 |

*Primary Examiner*—Brian L. Johnson
*Assistant Examiner*—Michael Cuff
*Attorney, Agent, or Firm*—David W. Hansen; Brian R. Suffredini

[57] ABSTRACT

A temperature compensating system for a closed system, such as a damping system, in which fluid is subject to temperature increases and accompanying volume increases. The temperature compensating system provides a compressible member within a temperature compensation volume, and a barrier restricting the entry of fluid to the volume. When the fluid volume increases as a result of temperature increases, fluid seeps past the barrier into the temperature compensation volume to compress the compressible member and thus increase the total volume available to the fluid in the closed system. The increased volume reduces pressure buildup that would otherwise occur, and thereby tends to maintain a steady pressure within the closed system. Dynamic or high speed fluid flows are restricted by the barrier or other restriction, inhibiting such flows from passing into the volume. The barrier or other restriction thus tends to prevent the temperature compensating system from interfering with normal functioning of the system while maintaining a steady internal pressure therein.

22 Claims, 5 Drawing Sheets

U.S. PATENT DOCUMENTS

| | | |
|---|---|---|
| 5,456,480 | 10/1995 | Turner et al. . |
| 5,494,302 | 2/1996 | Farris et al. . |
| 5,509,674 | 4/1996 | Browning . |
| 5,538,276 | 7/1996 | Tullis . |
| 5,580,034 | 12/1996 | Cheng . |
| 5,580,075 | 12/1996 | Turner et al. . |
| 5,598,903 | 2/1997 | Richardson . |
| 5,634,653 | 6/1997 | Browning . |
| 5,702,092 | 12/1997 | Farris et al. . |
| 5,743,362 | 4/1998 | Clinard et al. .......................... 188/276 |

TEMPERATURE COMPENSATING SYSTEM FOR FLUID-DAMPED SUSPENSION SYSTEMS

CROSS-REFERENCE TO RELATED APPLICATION

The present application claims the benefit of the earlier filing date of copending U.S. Provisional Patent Application Ser. No. 60/051,637, filed Jul. 3, 1997.

BACKGROUND OF THE INVENTION

The present invention relates to the design and construction of a temperature compensating system for a closed fluid-based system such as a damping system. More particularly, the present invention relates to a temperature compensating system adapted for compensating for increases in damping fluid volume due to temperature changes in a fluid damped suspension system so as to maintain a steady pressure within the damping system.

In the past, suspension systems have been used for various applications, including for cushioning impacts, vibrations, or other disturbances experienced by vehicles and machinery. Typical applications, for example, include the use of suspension systems in bicycles and motorcycles.

For example, bicycles have been developed with suspension systems for cushioning impacts or vibrations experienced by the rider when the bicycle contacts bumps, ruts, rocks, pot holes, or other obstacles in the path over which the bicycle is ridden. Typically, such bicycle suspension systems may be configured for use in the front or rear bicycle fork, in the head tube that connects the front fork to the bicycle frame and handlebars, in the seat post, in conjunction with a swing-arm assembly, or in another position along the bicycle frame.

Bicycle suspension systems typically include a pair of telescoping tubes (an inner tube and an outer tube) containing one or more biasing elements that oppose the compressive or expansive motion of the telescoping tubes. The biasing elements typically are spring devices such as coil springs, elastomer springs, gas springs such as air springs, among other types of springs. The biasing elements are placed within one or more of the tubes for biasing the tubes apart from each other. Using biasing elements in this way permits the tubes to compress in response to an impact or other force input, and expand or rebound once the force is removed, so that the inner and outer tubes return to their original spaced apart positions relative to each other.

Bicycle suspension systems have also included damping systems using generally incompressible fluids such as hydraulic oil, water, fish oil, and glycerine, among others, or a combination thereof. The damping systems act to absorb some of the energy of an impact or other force input causing compression or rebound of the tubes so that a more controlled response of the bicycle to force inputs may be achieved.

Exemplary closed fluid damping systems for bicycle suspension forks are described in U.S. Pat. No. 5,456,480 to Turner and U.S. Pat. No. 5,445,401 to Bradbury. The damping systems disclosed in Turner and Bradbury use hydraulic oil as the damping medium and include a piston and valve assembly. The oil, piston and valves are contained in a closed, or fixed-volume, cartridge system. When the telescoping members of the bicycle compress and/or expand, the oil is forced through restrictive orifices in the piston and valve assembly.

In general, a fluid damping system opposes motion by converting the energy of compressive or expansive motion into heat. This heat raises the temperature of the damping fluid in the system. For example, on a fairly cool day, the temperature within a typical damping system typically may reach approximately 110° F., and may go up to approximately 180° F. on hotter days. As the temperature of the damping fluid increases, the volume of the damping fluid expands. In a closed or fixed-volume damping system, an increase in fluid volume is problematic, as it tends to pressurize the oil in the system and even force oil out of the system causing undesirable leaking and, potentially, the irreversible failure of the system such as occurs when the damping seals are forced to roll outward from their proper positions. In addition, once the oil contracts to its nominal volume, the efficiency of the damping system will be reduced by the introduction of air to the system. Even where the closure of the system is not compromised, the pressurization and depressurization of the system has a deleterious effect on the seals and other damping components. Thus, there is a need for a damping system having a temperature compensating device that, when used in a fixed-volume, incompressible damping system cartridge, is able to compensate for increases in volume of the damping fluid caused by fluid temperature increases.

A temperature compensator that does not yield sufficiently to the expanding fluid may not be able to reduce the internal pressure of the damping system to an acceptable level. As a result, there is a need for a temperature compensating device for a fluid damping system of a suspension system that effectively reduces the internal pressure of the damping system created as temperatures therein increase and thereby tends to maintain a stable pressure in the system.

At the same time, the temperature compensating system should not yield too readily. A temperature compensating system that yields too easily in response to increases in damper fluid volume may reduce the effectiveness of the damper. For example, upon compression or expansion of the system, the oil may merely compress the temperature compensator instead of being forced through the valve assembly, thus rendering the valving ineffectual. Accordingly, there is a need for a temperature compensating system for a fluid damper of a suspension system that does not reduce the effectiveness of the damping system. There is a related need for a temperature compensating system that compensates for temperature changes within a damping system yet also permits steady damping control and thereby maintains consistent system performance.

SUMMARY OF THE INVENTION

It is therefore an object of the present invention to provide a damping system having a temperature compensating system that reduces system pressure increases caused by temperature increases during damping functions and thereby tends to maintain a steady pressure within the system.

It is a related object of the present invention to provide a damping system having a temperature compensating system that does not readily yield to high pressure conditions resulting from normal functioning of the damping system rather than from temperature increases.

The above and other advantages are realized in accordance with the principles of the present invention by providing a temperature compensating system, and a method for using such system, that compensates for increases in volume of an incompressible damping fluid in a damping system caused by increases in the temperature of the fluid.

In the preferred embodiment of the present invention, the temperature compensating system comprises a compressible member that is positioned behind a barrier. The barrier significantly restricts the ability of fluid to flow around the barrier, such that fluid flows during static conditions (during slow fluid movement, when damping is low), but is choked off during high speed dynamic conditions, where damping forces are high. The barrier thereby inhibits the compressible member from affecting the normal damping action of the damping system yet permits the compressible member to compensate for changes in volume of the damping fluid.

The above and other objects, features, and advantages of the present invention will be readily apparent from the following detailed description of the invention taken in conjunction with the accompanying drawings wherein like reference characters represent like elements, the scope of the invention being set out in the appended claims.

DETAILED DESCRIPTION OF THE INVENTION

Generally, the temperature compensating system of the present invention comprises a compressible member that yields or is decreased in volume as the damping fluid of the damping system expands with increases in the temperature of the system. Preferably, for any of the embodiments shown in FIGS. 1 through 11, the compressible member is formed of an expanded nitrile having a density of 0.05 grams/cc, but may also be made from a microcellular urethane elastomer, a gas-filled polyurethane bladder, or any other preferably highly compressible material or bladder arrangement. The compressible member is shielded from the action of the damping system on the oil by a fluid barrier. Fluid may seep past the barrier under static or low-speed flow conditions (slow fluid movement or when damping is low) to compress the compressible member in response to volume changes brought on by an increase in damping fluid temperature. However, under high speed or dynamic conditions, the flow is unable to pass around the barrier, and the barrier thereby prevents the high damping forces from compressing the compressible member instead of passing through the proper damping circuits to effectuate damping.

Figure 1:
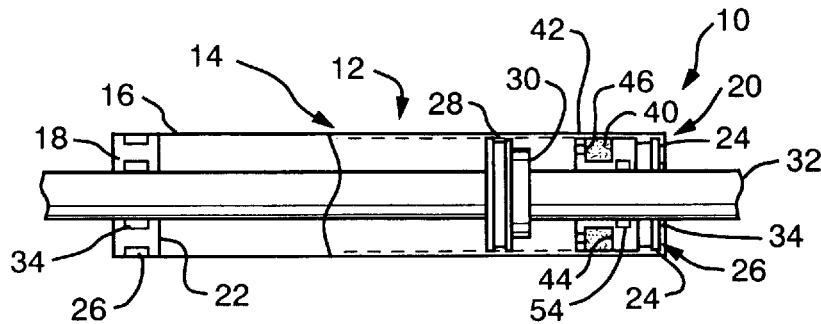
FIG. 1 is a cross-sectional view of a preferred embodiment of temperature compensating system formed in accordance with the principles of the present invention shown positioned in a fluid damping system of a suspension system.
Figure 3:
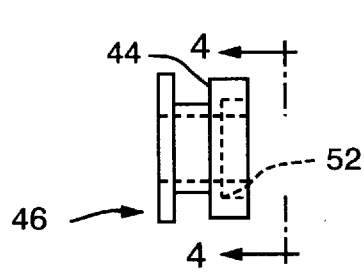
FIG. 3 is a side elevational view of the compressible member retainer of FIGS. 1 and 2.
Figure 4:
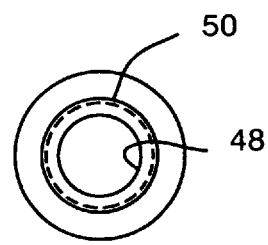
FIG. 4 is a plan view along line IV—IV of the compressible member retainer of FIG. 2.
Figure 5:
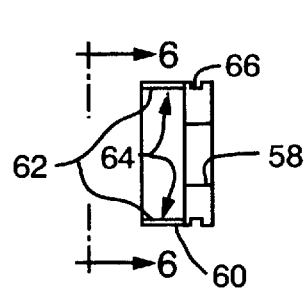
FIG. 5 is a side elevational view of the end cap of FIGS. 1 and 2.
Figure 9:
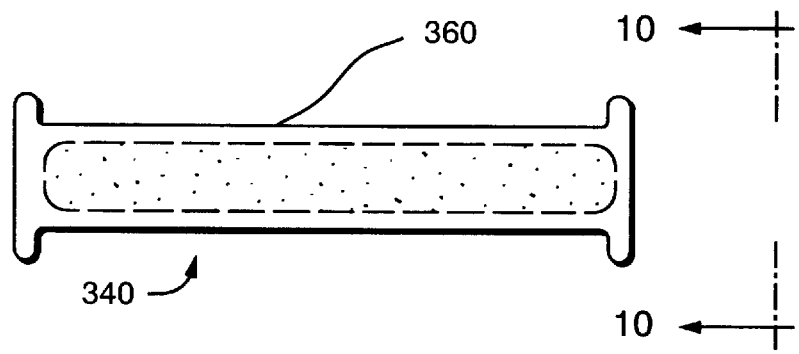
FIG. 9 is a side elevational view of an alternative embodiment of the compressible member of FIG. 8, which may also be adapted for use in the embodiments of FIGS. 1 through 7 and 11.

In the embodiment illustrated in FIG. 1, a temperature compensating system 10 is formed in accordance with the principles of the present invention and incorporated into a damping system 12. Generally, damping system 12 is designed for use in a suspension system and uses a common grade of hydraulic oil. Although the particular weight of hydraulic oil used is not important to the operation of the present invention, oils having SAE weight 2.5, 5, 8, 10, 15 or 20, for example, are very common and may be used. It will also be appreciated that a variety of "incompressible" fluids such as fish oil, glycerine or water, or a combination of one or more such fluids, or of one or more of such fluids with hydraulic oil, may be used to equal effect. Damping system 12 has a damping cartridge 14 with a substantially cylindrical wall 16, and first and second ends 18, 20 with a respective end cap 22, 24. Substantially the entire volume of damping cartridge 14 is filled with the hydraulic oil. Accordingly, a seal 26, such as an O-ring, is preferably provided between each end cap 22, 24 and damping cartridge wall 16 to retain the damping fluid within damping cartridge 14. A piston 28 and at least one valve assembly 30 are connected to or formed integrally with a piston rod 32 that extends into damping cartridge 14. Preferably, as shown in FIG. 9, piston rod 32 extends through damping cartridge 14, and end caps 22, 24 and seals 26 are preferably annular such that piston rod 32 may slidably extend therethrough. Also preferably, a piston rod seal 34 is provided between end caps 22, 24 and piston rod 32 to further ensure that damping fluid does not leak out of damping cartridge 14.

Piston rod 30 passes through temperature compensating system 10, which is positioned between the two ends 18, 20 of damping system 12. Although temperature compensating system 10 is shown positioned toward end 20, it will be appreciated that temperature compensating system 10 instead may be positioned toward end 18, or one such system may be placed toward end 20 in conjunction with another positioned toward end 18.

Figure 2:
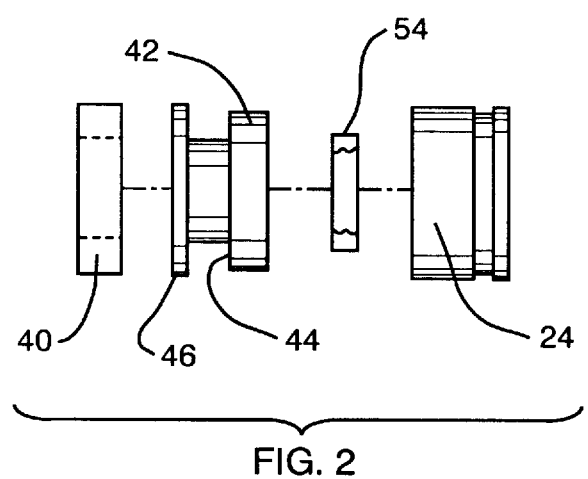
FIG. 2 is an exploded view of the temperature compensating system of FIG. 1.

An exploded view of the elements of temperature compensating system 10 is provided in FIG. 2 to simplify understanding of system 10. In the embodiment shown in FIGS. 1 and 2, temperature compensating system 10 comprises a compressible member 40 housed in a compressible member retainer 42 and a specially designed end cap 24. Each of compressible member 40, retainer 42, and end cap 24 are preferably annular to permit piston rod 32 to pass slidably therethrough. In FIGS. 1 and 2, compressible member 40 preferably is formed from a expanded nitrile or microcellular urethane elastomer, as discussed above, or from a similarly compressible material. As will be subsequently described in more detail, compressible member 40 instead may be comprised, for example, of an gas-filled bladder. Also shown in FIGS. 1 and 2 is compressible member retainer 42, which is preferably made of a lightweight, durable plastic or metal material. As will be described in further detail below, compressible member retainer 42 and end cap 24 permit compressible member 40 to effectuate an increase in damping cartridge volume only under the appropriate operating conditions.

As can be seen in FIGS. 1 through 4, compressible member retainer 42 is cylindrically shaped and has a compressible member seating portion 44 and a fluid barrier portion 46. The seating portion 44 of retainer 42 has an inner surface 48 and an outer surface 50. Inner surface 48 of seating portion 44 has an annular recess 52 formed therein and sized for seating a piston rod seal 54, as may be appreciated with reference to FIG. 1.

Outer surface 50 is shaped to hold compressible member 40 therein, as may be appreciated with reference to FIG. 1. In particular, as shown in FIGS. 1 and 2, retainer seating portion 44 and fluid barrier portion 46 of compressible member retainer 42 define an annular space 56 in which compressible member 40 is seated. Fluid barrier portion 46 of compressible member retainer 42 extends substantially perpendicular to damping cartridge wall 16 and is rigid and sized for close engagement with damping cartridge wall 16. For example, the two are preferably separated by about a 0.004 to 0.005 inch clearance.

In general, as the suspension system with which damping system 12 is used compresses and rebounds during use, the temperature of the damping fluid within damping system 12 will increase, and, as a result, the volume of the fluid will increase as well. Under static conditions, when the suspension system is not in motion, or during low speed compression or rebound of the suspension system accompanied by low speed damping, the damping fluid seeps around fluid barrier portion 46 of compressible member retainer 42 as the damping fluid pressure and volume increase. This low speed seeping action causes compressible member 40 to compress or collapse, thereby permitting the temperature compensation volume formed by annular space in which compressible member 40 is seated (the space formed by retainer seating portion 44 and fluid barrier portion 46) to accommodate the increased fluid volume of damping system 12. Thus, the seeping action helps maintain an acceptable, steady, substantially constant internal pressure in damping system 12.

During high speed compression or rebound of the suspension system, resulting in high damping forces, piston 28 forces fluid against fluid barrier portion 46 of compressible member retainer 42. Because barrier 46 is rigid and maintains a close fit with respect to damper wall 16, seepage around barrier portion 46 is choked off under dynamic, high speed conditions. Damping fluid is thus forced through the piston valving as is desired so that damping of the compressive or expansive motion occurs. If the damping fluid were able to flow freely around barrier portion 46 during high speed compression or rebound of the suspension system, the damping fluid would tend to compress compressible member 40 instead of passing through the piston valving as necessary for proper damping function, resulting in poor damping characteristics. Under high-force compressive or expansive piston strikes, compressible member retainer 42 remains securely attached to end cap 24, as described below, so that compressible member 40 and compressible member retainer 42 will not interfere with operation of the piston and valves.

Figure 6:
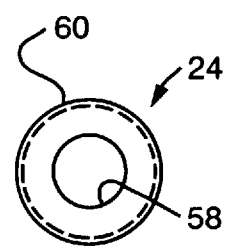
FIG. 6 is a plan view along line VI—VI of the end cap of FIG. 5.

As illustrated in FIGS. 1, 2, 5 and 6, end cap 24 is preferably substantially cylindrical and has an inner surface 58 and an outer surface 60. Inner surface 58 of end cap 24 is sized to mate with outer surface 50 of retainer seating portion 44 of compressible member retainer 42. Inner surface 58 of end cap 24 has a positive lock device 62 comprising at least one and preferably a plurality of raised ridges 64, as shown in FIG. 6. Thus, when retainer seating portion 44 is fully inserted into end cap 24, positive lock device 62 will secure compressible member retainer 42 to end cap 24. In a preferred embodiment, ridge 64 is positioned to engage within seating portion 44 of retainer 42. One advantage of the positive lock feature is that upon a sudden compression or rebound of the suspension system, positive lock device 62 prevents compressible member retainer 42 from migrating within damping cartridge 12 and interfering with the operation of damping system 10.

End cap 24 also functions to seal end 20 of damping cartridge 14. Thus, when retainer seating portion 44 is engaged within end cap 24, piston shaft seal 54, positioned within annular recess 52 of retainer seating portion 44, is securely seated between end cap 24 and retainer seating portion 44. Additionally, a groove 66 is preferably formed in outer surface 60 of end cap 24 for seating seal 26 for preventing oil from leaking out of damping system 12.

Alternative embodiments of a temperature compensating system formed in accordance with the principles of the present invention are shown in FIGS. 7 through 10. Elements corresponding to the elements of the embodiment of FIG. 1 are indicated by the same reference numeral, increased by 100, in FIG. 7, by 200 in FIGS. 8, by 300 in FIGS. 9 and 10, and by 400 in FIG. 11.

Figure 7:
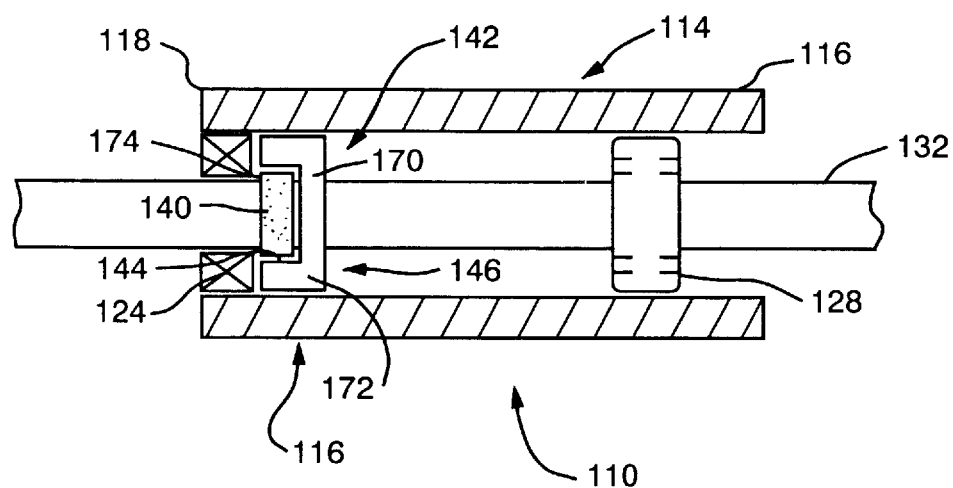
FIG. 7 is a cross-sectional view of an alternative embodiment of a temperature compensating system formed in accordance with the principles of the present invention and positioned in a fluid damping system of a suspension system.

The temperature compensating system 110 of FIG. 7 has a compressible member retainer 142 with a fluid barrier portion 146 formed to serve as a compressible member seating portion 144 as well. As will be appreciated, barrier portion 146 thus includes, in addition to perpendicular portion 170 (perpendicular to cartridge wall 116), a substantially cylindrical wall portion 172, extending substantially concentrically within damping cartridge wall 116, which encloses compressible member 140. Compressible member retainer 142 may be attached either to the cylindrical damping cartridge wall 116 or to end cap 124. End cap 124 closes the end 118 of cartridge body 114. Thus, a temperature compensation volume 174, in which compressible member 140 is positioned, is created. Damping fluid within cartridge body 114 may seep into volume 174 under static conditions to accommodate increased damping fluid volumes resulting from temperature increases in the system, and thereby reduce increased pressure in the cartridge body 114. A relatively steady, substantially constant pressure may thus be maintained in damping system 112.

Figure 8:
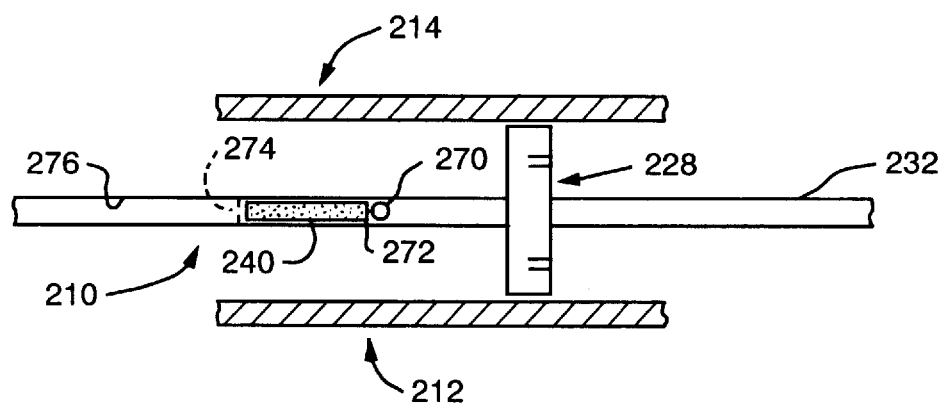
FIG. 8 is a cross-sectional view of another alternative embodiment of a temperature compensating system formed in accordance with the principles of the present invention and positioned in a fluid damping system of a suspension system.

The temperature compensating system 210 of FIG. 8 has a hollow piston rod 232 with at least one orifice 270 formed therein. A compressible member 240 is placed within piston rod 232 adjacent orifice 270, creating a temperature compensation volume 272 between compressible member 240 and orifice 270, as will now be described. Preferably, a retainer 274, such as an internal shoulder or ridge, is coupled to or integrally formed on the interior surface 276 of piston rod 232 to maintain said compressible member 240 in a fixed position and thus prevent relative movement between compressible member 240 and piston rod 232. The retainer 274 may also comprise a damping control mechanism such as that described in a U.S. Provisional Patent Application entitled "Damping System Having Separately Adjustable Damping Circuits," which was filed Sep. 16, 1997, in the name of Ricardo R. Baldomero (the "Sep. 16, 1997 Baldomero Provisional Application"), and has not yet been accorded a serial number. The Sep. 16, 1997 Baldomero Provisional Application is incorporated herein in its entirety. Compressible member 240 is preferably sized for close engagement with interior surface 276 of piston rod 232. For example, the two are preferably separated by about a 0.004 to 0.005 inch clearance.

Figure 10:
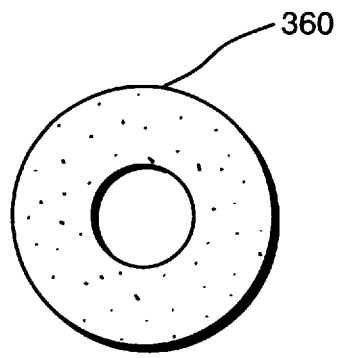
FIG. 10 is a plan view along line X—X of the compressible member of FIG. 9.

As in the embodiment of FIGS. 1 through 7, the compressible member in FIG. 8 (compressible member 240) is formed from an expanded nitrile or microcellular urethane elastomer material, but may alternatively be comprised, for example, of an gas-filled bladder such as comprises the compressible member 340 of FIGS. 9 and 10. Specifically, compressible member 340 of FIGS. 9 and 10 is preferably formed of a flexible polyurethane bladder 360. Although bladder 360 may be filled with any gas, it is preferably filled with air, which is inserted at atmospheric pressure before bladder 360 is sealed. Sealing bladder 360 may be accomplished, for example, by ultrasonic welding. It will be appreciated that compressible member 340 may be closely fitted within a piston rod as described above in connection with compressible member 240 of FIG. 8, or may be formed in an annular or other shape for use in the embodiments of FIGS. 1 through 7, as well as in other embodiments.

With respect to the embodiments of FIGS. 8 through 10, orifice 270 functions much as the barrier portion 46 and 146 of FIGS. 1 through 7 to regulate the temperature and pressure compensating function of temperature compensating system 210 as follows. Orifice 270 is preferably sized and positioned to permit low speed fluid flow to pass into temperature compensation volume 272 within piston rod 232. Thus, under static conditions, increased damping fluid volume, resulting from increased damping fluid temperature, flows into piston rod 232 and compresses compressible member 240 or 340. The temperature compensation volume 272 within piston rod 232 between orifice 270 and compressible member 240 or 340 can thereby compensate for and accommodate the increased fluid volume caused by temperature increases, and thereby maintain a steady, substantially constant internal pressure within damping system 212. However, orifice 270 is preferably sized to choke or restrict high speed flows from passing therethrough, so that the compressible member 240 or 340 will not degrade the high-speed dynamic damping characteristics of the damping system 212. As an alternative to, or in addition to orifice 270, an orifice may be formed, and the restriction of high speed flows may be equally well accomplished, using the device disclosed in the Sep. 16, 1997 Baldomero Provisional Application, by sizing the flow adjustment mechanisms disclosed therein appropriately to permit low speed flows, yet to restrict high speed flows. This is also a preferred method of performing the present invention, as such adjustment mechanisms can serve the dual function of an orifice and a retainer.

Figure 11:
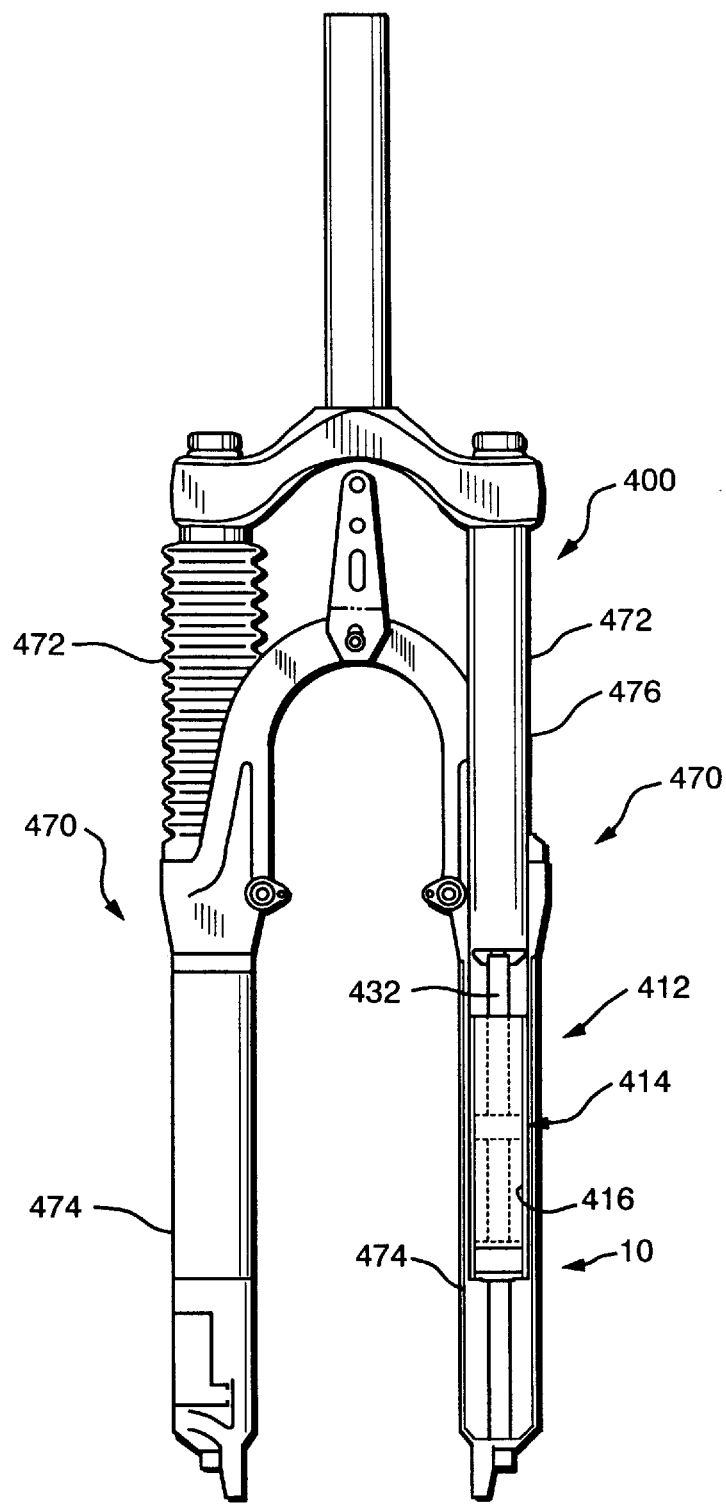
FIG. 11 is a cross-sectional view of an exemplary bicycle suspension fork in which is positioned a cartridge-type fluid damping system having a temperature compensating system formed in accordance with the principles of the present invention.

The temperature compensating system of the present invention is preferably applied in the damping system of a bicycle suspension fork 400 as shown in FIG. 11. The damping system 412 and temperature compensating system 410 incorporated into fork 400 may be any of those systems shown in FIGS. 1 through 10. Although any type of bicycle fork could be used, the preferred bicycle suspension fork 400 of FIG. 11 has two fork legs 470, each leg comprising an inner tube 472 that telescopes into an outer tube 474. Fork 400 may include a spring-type suspension device 476, which may be comprised of a microcellular urethane spring member in combination with a steel coil spring, or any other desirable biasing element, positioned in inner fork tube 472 above the location of the damping cartridge 414. Although not necessary for proper performance of the present invention, the cylindrical damping cartridge wall 416 in the embodiment of FIG. 11 comprises a cartridge-type body which is removable from the bicycle suspension fork 400 for servicing or replacement. Alternatively, the damping cartridge wall 416 may comprise the inner telescoping tube 472 of the bicycle fork 400.

While the foregoing description and drawings represent the preferred embodiments of the present invention, it will be understood that various additions, modifications and substitutions may be made therein without departing from the spirit and scope of the present invention as defined in the accompanying exemplary claim. In particular, it will be clear to those skilled in the art that the present invention may be embodied in other specific forms, structures, arrangements, proportions, and with other elements, materials, and components, without departing from the spirit or essential characteristics thereof. For example, the temperature compensating system of the present invention may be used in machinery and vehicle suspension systems other than damping systems of bicycle suspension systems. One skilled in the art will further appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. A temperature compensating system for a cylindrical body having first and second ends closed by end caps and containing a fluid responsive to temperature increases, said temperature compensating system accommodating increases in fluid volume caused by increased fluid temperature and thereby tending to maintain a steady internal pressure within said cylindrical body, said temperature compensating system comprising:

a retainer positioned within said cylindrical body adjacent one of said end caps, said retainer having a barrier portion and a seating portion between said barrier portion and said end cap; and a compressible member seated on said seating portion of said retainer;

wherein said barrier portion permits seepage of fluid from within said cylindrical body to compress said compressible member when said fluid volume in said cylindrical body increases as fluid temperature rises, and said barrier portion tends to prevent compression of said compressible member in response to dynamic flow.

2. A temperature compensating system as in claim 1, wherein:

said barrier portion and said seating portion form a volume in which said compressible member is seated; and when said compressible member is compressed by fluid in the cylindrical body, and said volume in which said compressible member is seated accommodates the increased fluid volume.

3. A temperature compensating system as in claim 1, wherein said barrier portion is substantially perpendicular to the cylindrical body and forms an annular space with said seating portion, said compressible member being seated in said annular space.

4. A temperature compensating system as in claim 1, wherein:
   said barrier portion comprises a first portion substantially perpendicular to the cylindrical body and a second cylindrical portion substantially concentrically positioned within the cylindrical body between said first portion and the end cap;
   said second cylindrical portion forms said seating portion; and
   said compressible member is seated within said second cylindrical portion.

5. A temperature compensating system as in claim 1, wherein said compressible member is an elastomer.

6. A temperature compensating system as in claim 1, wherein said compressible member comprises a bladder containing a gas.

7. A temperature compensating system as in claim 1, wherein said retainer is locked with respect to the end cap.

8. A damping system comprising:
   a cartridge body with first and second ends each closed by an end cap, said cartridge body being filled with a damping fluid;
   a piston rod extending into said cartridge body and through at least one of said end caps;
   a piston mounted on said piston rod and enclosed within and engaging said cartridge body;
   valving through at least one of said piston rod and said piston to permit fluid to pass said piston within said cartridge body;
   a temperature compensating system comprising a compressible member positioned within a volume defined within said damping system such that increased temperature within said damping system causes resulting increased fluid volumes to flow into said volume in which said compressible member is positioned and to compress said compressible member to maintain a steady internal pressure within said damping system;
   said temperature compensating system further comprises a retainer positioned adjacent one of said end caps;
   said volume in which said compressible member is positioned is formed by a portion of said retainer;
   said retainer further comprises a barrier portion and a compressible member seating portion;
   said barrier portion and said compressible member seating portion form said volume in which said compressible member is positioned; and
   said barrier permits seepage of damping fluid into said volume in which said compressible member is positioned under static conditions, and said barrier portion tends to restrict fluid flow during dynamic high speed damping conditions and thereby prevents fluid from entering said volume in which said compressible member is positioned.

9. A damping system comprising:
   a cartridge body with first and second ends each closed by an end cap, said cartridge body being filled with a damping fluid;
   a piston rod extending into said cartridge body and through at least one of said end caps;
   a piston mounted on said piston rod and enclosed within and engaging said cartridge body;
   valving through at least one of said piston rod and said piston to permit fluid to pass said piston within said cartridge body;
   a temperature compensating system comprising a compressible member positioned within a volume defined within said damping system such that increased temperature within said damping system causes resulting increased fluid volumes to flow into said volume in which said compressible member is positioned and to compress said compressible member to maintain a steady internal pressure within said damping system;
   said temperature compensating system further comprises a retainer positioned adjacent one of said end caps;
   said volume in which said compressible member is positioned is formed by a portion of said retainer;
   said retainer further comprises a barrier having a first portion substantially perpendicular to said cylindrical body and a second cylindrical portion substantially concentrically positioned within the cylindrical body between said first portion and said end cap;
   said first and second portions of said barrier forming said volume in which said compressible member is positioned; and
   said first portion of said barrier permits seepage of damping fluid into said volume in which said compressible member is positioned under static conditions, and said barrier portion tends to restrict fluid flow during dynamic high speed damping conditions and thereby prevents fluid from entering said volume in which said compressible member is positioned.

10. A damping system comprising:
    a cartridge body with first and second ends each closed by an end cap, said cartridge body being filled with a damping fluid:
    a piston rod extending into said cartridge body and through at least one of said end caps;
    a piston mounted on said piston rod and enclosed within and engaging said cartridge body;
    valving through at least one of said piston rod and said piston to permit fluid to pass said piston within said cartridge body;
    a temperature compensating system comprising a compressible member positioned within a volume defined within said damping system such that increased temperature within said damping system causes resulting increased fluid volumes to flow into said volume in which said compressible member is positioned and to compress said compressible member to maintain a steady internal pressure within said damping system;
    said piston rod is hollow and has an orifice formed therein;
    said compressible member is positioned within said piston rod;
    a retainer is positioned within said piston rod to restrain movement of said compressible member within said piston rod; and
    said orifice permits seepage of damping fluid into said piston rod and against said compressible member under static conditions to accommodate increased fluid volume resulting from increased temperatures in said damping system.

11. A damping system as in claim 10, wherein said orifice restricts fluid flow during dynamic high speed damping conditions and thereby prevents fluid from compressing said compressible member.

12. A damping system as in claim 10, wherein said retainer restricts fluid flow during dynamic high speed damping conditions and thereby prevents fluid from compressing said compressible member.

13. A damping system as in claim 10, wherein said compressible member is an elastomer.

14. A damping system as in claim 10, wherein said compressible member comprises a bladder containing a gas.

15. A temperature compensating system for use in a damping system having a cartridge body containing a damping fluid, a piston rod extending into said cartridge body, a piston mounted on said piston rod and enclosed within and engaging said cartridge body, at least one valve to permit fluid to pass said piston within said cartridge body, said temperature compensating system comprising:

an end cap;

a retainer coupled to said end cap, said retainer having a barrier portion and a seating portion between said barrier portion and said end cap; and a compressible member seated on said seating portion of said retainer;

wherein said barrier portion permits seepage of fluid from within the cartridge body toward said compressible member when said fluid volume in said cartridge body increases as fluid temperature rises and thereby tends to maintain a steady pressure within the cartridge body, and said barrier portion tends to prevent compression of said compressible member in response to dynamic flow such that damping fluid flows through said valving during dynamic damping functions.

16. A temperature compensating system as in claim 15, wherein:

said barrier portion is substantially perpendicular to said cartridge body;

said barrier portion and said seating portion form a volume in which said compressible member is seated; and when said compressible member is compressed by fluid in the cylindrical body, said volume in which said compressible member is seated accommodates the increased fluid volume.

17. A temperature compensating system as in claim 15, wherein:

said barrier portion comprises a first portion substantially perpendicular to said cartridge body and a second cylindrical portion substantially concentrically positioned within said cartridge body between said first portion and said end cap;

said second cylindrical portion forms said seating portion; and said compressible member is seated within said second cylindrical portion.

18. A temperature compensating system as in claim 15, wherein said compressible member is an elastomer.

19. A temperature compensating system as in claim 15, further comprising a locking device coupled between said retainer and said end cap to lock said retainer with respect to said end cap.

20. A method of maintaining a steady pressure within a damping system containing as the temperature of damping fluid within the damping system rises and causes the volume of the damping fluid to increase, the damping system comprising a cartridge body with first and second ends each closed by an end cap, a piston rod extending into said cartridge body and through at least one of said end caps, a piston mounted on said piston rod and enclosed within and engaging said cartridge body, and valving through at least one of said piston rod and said piston, said method comprising the steps of:

providing a compressible member in a temperature compensation volume in said cartridge body;

providing a barrier to fluid flow into said temperature compensation volume, said barrier permitting seepage of damping fluid into said temperature compensation volume to compress said compressible member under static conditions when said damping fluid volume increases as a result of a temperature increase, and said barrier tending to restrict fluid flow under dynamic damping conditions such that dynamic flow of damping fluid during damping operation is prevented from flowing past said barrier into said temperature compensation volume.

21. A method as in claim 20, wherein said step of providing a compressible member in a temperature compensation volume in said cartridge body further comprises the step of providing a retainer having a barrier portion forming said barrier and a compressible member seating portion, said barrier and compressible member seating portion forming said temperature compensation volume in said cartridge body.

22. A method as in claim 20, wherein:

said piston rod is hollow and has an orifice defined therein; and said step of providing a compressible member in a temperature compensation volume in said cartridge body further comprises the step of positioning said compressible member within said hollow piston rod adjacent said orifice such that increased damping fluid volume flows through said orifice under static conditions to compress said compressible member and thereby maintain a steady pressure within said damping system.

* * * * *